United States Patent [19]
Taylor et al.

[11] Patent Number: 5,884,992
[45] Date of Patent: Mar. 23, 1999

[54] MODULAR INDIVIDUAL LIGHTING ARRANGEMENT FOR SPORTS ACTIVITIES

[75] Inventors: James F. Taylor, 200 Moore Creek Rd., Santa Cruz, Calif. 95060; Nicholas F. Talesfore, Los Gatos, Calif.

[73] Assignee: James F. Taylor, Los Gatos, Calif.

[21] Appl. No.: 716,909

[22] Filed: Sep. 19, 1996

[51] Int. Cl.$^6$ ....................................... B62J 6/00
[52] U.S. Cl. .......................... 362/72; 362/190; 362/191; 362/249; 362/370
[58] Field of Search .............. 362/72, 190, 191, 362/196, 249, 370, 368

[56] References Cited

U.S. PATENT DOCUMENTS 5,379,540  1/1995  Howard ...................................... 40/558
5,436,810  7/1995  Sutheland et al. ......................... 362/72
5,477,425  12/1995  Sun et al. .................................. 362/72

*Primary Examiner*—Ira S. Lazarus
*Assistant Examiner*—David Lee
*Attorney, Agent, or Firm*—Flehr Hohbach Test Albritton & Herbert,LLP

[57] ABSTRACT

A modular individual lighting arrangement for sports activities, such as mountain biking, is described. Such modular unit includes a light bulb housing having an exterior configuration to interact with a second housing by attaching such housings together. An intermediary receiver is included having a pair of spring fingers which are spaced apart an appropriate distance to interact both with a complementary set of apertures on a single housing and with corresponding apertures in two housings.

6 Claims, 2 Drawing Sheets

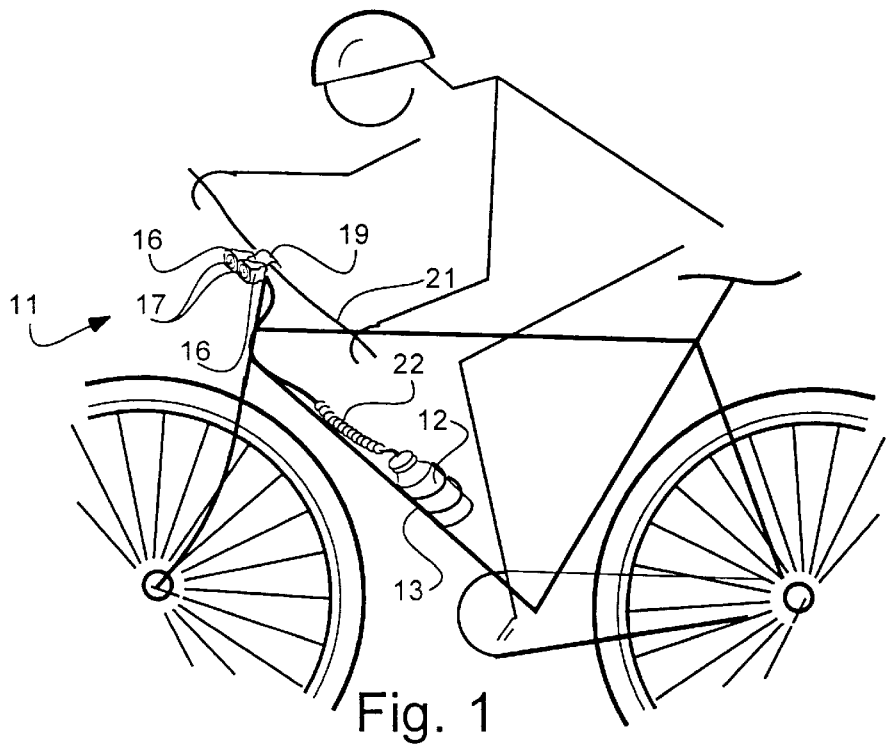
Fig. 1
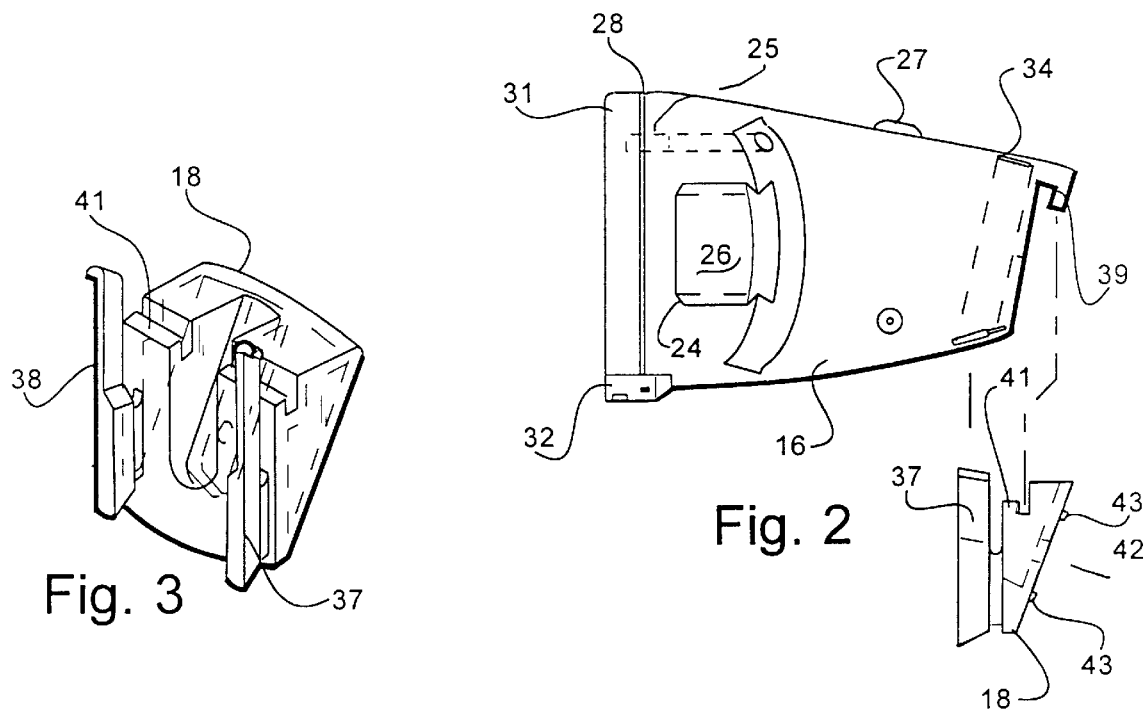
Fig. 3
Fig. 2

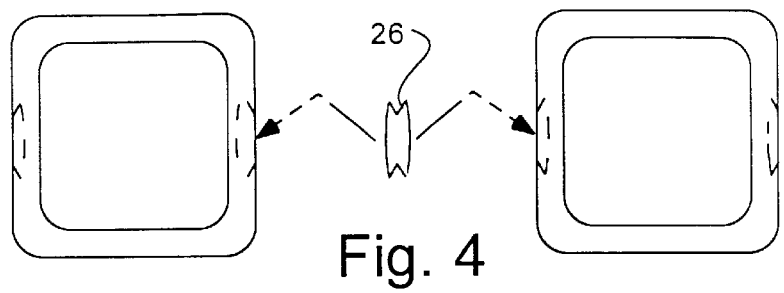
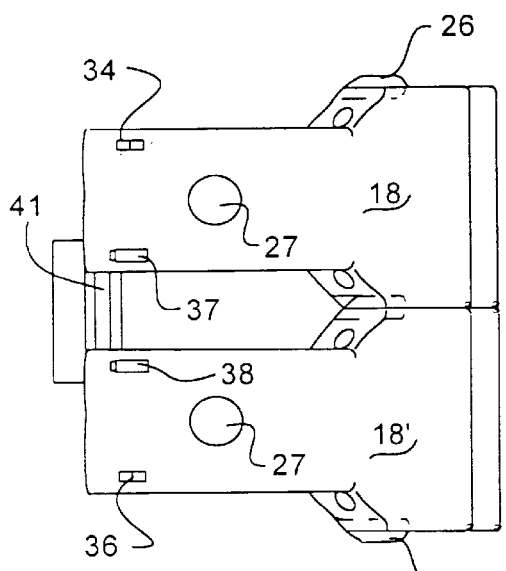
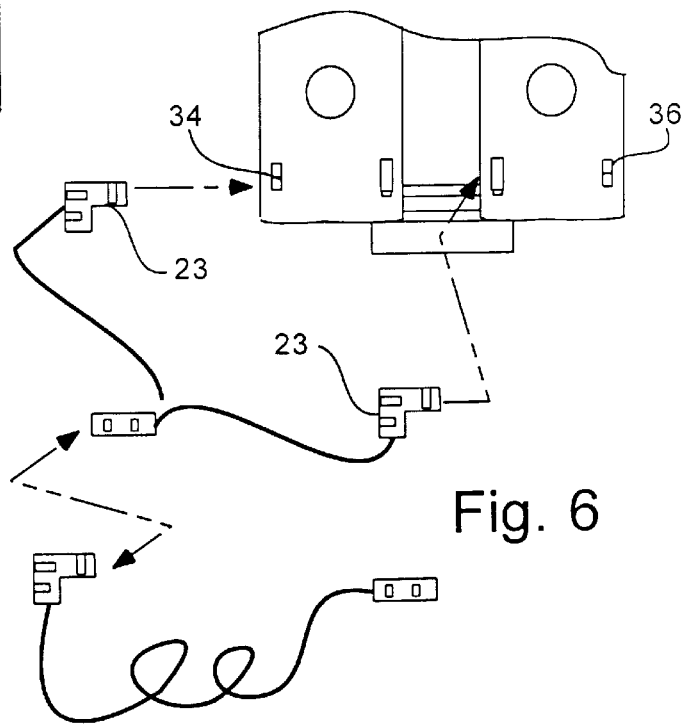

5,884,992

MODULAR INDIVIDUAL LIGHTING ARRANGEMENT FOR SPORTS ACTIVITIES

BACKGROUND OF THE INVENTION

The present invention relates to individual lighting arrangements for sport activities and, more particularly, to a modular lighting arrangement.

Individual lighting arrangements have been designed for certain participatory sport activities. Such arrangements are available, for example, for mountain biking participants. Such arrangements typically include one or two actual light bulbs contained in a housing mountable via an intermediary receiver and an appropriate mount on (for mountain biking) a rider's helmet or the handlebars of the bicycle. Such an arrangement also includes a power source, such as a battery pack, which is carried in a back or fanny pack by the rider or within the bicycle's mounting structure for a water bottle. A power cord or the like extends from the source to light bulb(s) within the housing to deliver the necessary electrical power to the light bulbs.

A difficulty with the arrangements now available is that each is typically a stand-alone unit. For example, if one purchases an arrangement having a single light bulb and then wishes to change to a dual light bulb arrangement, the full arrangement or, at least, the single light bulb housing portion has to be replaced.

SUMMARY OF THE INVENTION

The present invention provides a lighting arrangement which eliminates the need for replacing major components when one wishes to convert from a single light bulb unit, to a multiple one, such as two. A major aspect of the modular arrangement of the invention is the design of the housing for the light bulb. Even though the housing is designed for a single bulb, it has an exterior configuration adapted for selective attachment to another housing of like type. In this connection, most desirably the housing has an exterior female cavity to interact with a first portion of an insert to hold the insert in a position extending beyond such housing. The portion of the insert which projects beyond the first housing is adapted to interact with a complementary cavity on a second housing and thus connect the two housings together.

Another major aspect of the invention relates to the intermediary receiver which is provided to connect the housing(s) to a mount designed for the particular sport implement in question. The means of the intermediary receiver which holds on to the light housing has a pair of spring fingers which interact with complementary apertures in the housing to provide a snap engagement at their location, and a ledge which cooperates with a complementary ledge on the housing to provide an interlocking grip. As a particularly salient feature of the invention, the spring fingers on the intermediary receiver are not only spaced apart an appropriate distance to interact with complementary apertures on a single housing but also to interact with complementary apertures on a pair of housings when a pair is appropriately provided, and the ledge is such that it interacts with the complementary ledges on both of such light housings. Thus, a single intermediary receiver cooperates to provide proper mounting of either a single light for illumination or a pair of lights.

Other features and advantages of the invention either will become apparent or will be described in connection with the following, more detailed description of a preferred embodiment of the invention and variations.

BRIEF DESCRIPTION OF THE DRAWING

With reference to the accompanying drawing:

FIG. 1 is a schematic showing of a portion of a bicycle, a rider, and a preferred embodiment of the present invention;

FIG. 2 is a side view of a modular housing of the preferred embodiment of FIG. 1, showing an intermediary mounting receiver exploded from it;

FIG. 3 is an isometric view of an intermediary mounting receiver of the preferred embodiment;

FIG. 4 is an exploded front view of a pair of light housings and an insert for the same;

FIG. 5 is a top plan view of a pair of light housings interacting with a single intermediary receiver of the preferred embodiment of the invention; and FIG. 6 is a partial view of a two lighting arrangement of the preferred embodiment with a power splitter of such preferred embodiment.

DETAILED DESCRIPTION OF THE PREFERRED EMBODIMENT(S)

The following relatively detailed description is provided to satisfy the patent statutes. It will be appreciated by those skilled in the art, though, that various changes and modifications can be made without departing from the invention.

A preferred embodiment of the invention is illustrated in FIG. 1, combined with a typical mountain bike and rider (both shown schematically and partially). The lighting arrangement is generally referred to by the reference numeral 11. Such lighting arrangement includes a source of electrical power, e.g. a battery pack 12 held on frame bar 13 of the bicycle. The battery pack simply can be a number (5, 7 or 11 are typical) of C-type lead acid batteries which are secured together via, for example, shrink wrapping.

A light source provided by a pair of housing 16 (FIG. 2) and light bulbs 17 is mounted by an intermediary receiver 18 and standard handlebar mount 19 to handlebars 21 of the bicycle. A power cord 22 is illustrated delivering power from the battery pack 12 to the light source. In this connection, cord 22 includes plug connectors 23 (FIG. 6) which mate with complementary sockets provided by housings 16. (It should be noted that the power is not directly delivered to the bulb in each housing, but by a typical arrangement within the housing 16 which provides interaction between the bulbs and such cord.)

Neglecting for the moment the inventive aspects of the preferred embodiment, the arrangement disclosed in FIG. 1 is typical. The light source provides relatively intense illumination for the rider. In most instances, however, the rider has an arrangement providing only a single light bulb. And although the arrangement is being described in connection with mountain biking, it is typically useful for other sports activities, such as cross country skiing.

The present invention is a modular arrangement. As mentioned previously, one major aspect of it relates to the light bulb housing 16. It is illustrated in some detail in FIG. 2. The housing has an exterior configuration which is attractive and yet enables the same to be selectively attached to a second housing for another light bulb. It includes a female cavity 24 which interacts with an insert 26 which fills the same. As can be seen best in FIG. 5, the insert 26 projects outward beyond the housing 16. When the modular housing of the invention is used in an arrangement having a single light bulb, the insert 26 adds to the attractiveness of the unit. In this connection, its shape generally conforms to the curvature incorporated into the housing. A pushbutton 27 is also included at the top of the housing. The housing is symmetrical, i.e., the side of the housing opposed to that side shown in FIG. 2 is identical and, in this connection, includes a female cavity and insert as discussed above. A pair of Allen head bolts 25 extend through the housing, through a gasket 28 which maintains the light bulb and its casing in place, into the upper portion of a bezel 31. The lower portion is held in position on the housing via a standard slot and tab arrangement partially provided by a flange 32 projecting from the front of the housing.

Housing 16 further includes means for securing the same to intermediary receiver 18. To this end, it includes a pair of slotted apertures 34 and 36 (FIG. 5) which are complementary to spring fingers 37 and 38 of the receiver 18. In this connection, each of the spring fingers preferably is designed to project beyond its complementary housing slot the small distance that is necessary to provide a snap fit. Moreover, although not shown it will be recognized that the rear surface of the housing is slotted to accommodate the connections of the spring fingers to the remainder of the receiver. A ledge 39 is provided on the housing which is engageable with a complementary ledge 41 on the receiver to interlock the housing and receiver together.

The intermediary receiver 18 is adapted for rigid securance to a standard mount 19. In this connection, it includes a rivet hole 42 (FIG. 2) and a pair of locating pins or nubs 43. When the receiver is used with a single light housing, both of its spring fingers are received within the complementary apertures of the housing. Moreover, the ledges on the housing and on the receiver interlock for their full linear extent.

A major feature of the modular lighting arrangement of the invention is that if one wants a two light bulb arrangement instead of a single one, rather than discarding the single one, it is only necessary to add the additional parts for a dual one rather than discard the old and start fresh. To this end, the insert/female cavity arrangement is usable to attach adjacent light housings together. FIGS. 4 and 5 illustrate such arrangement. The portion of the insert 26 which extends beyond the housing of which it is a part interacts with a female cavity on the second housing side to secure the housings together. As can be seen from FIG. 4, the projecting portion of the insert is simply a mirror image of most of the connecting portion of the part of the insert which interacts with the first housing.

The receiver of the invention and the manner in which it interacts with the light bulb housing(s) is such that a single receiver can be used with two light housings. The top view of FIG. 5 illustrates this point. While one of the spring fingers 37 of the receiver fits within aperture 36 of one of the housings 18, the other spring finger, spring finger 38 fits within the aperture 34 of the second housing 18'. In this connection, the distance between the spring fingers 37 and 38 is selected not only to be the appropriate distance for interacting with a single light bulb housing, but also for interacting with a dual arrangement as is illustrated. (It will be recognized that much juggling of dimensions is necessary to provide such a design.)

Although the invention is described in connection with the conversion of a single light bulb arrangement to a dual light bulb arrangement, it will be recognized that from the broad standpoint the invention is also applicable to an arrangement in which there will be three (or more) light bulb housings. While a three light housings arrangement may be unusual, they are to be usable, e.g., by a security force with one of the lenses being red. The invention can provide the same. One way is simply to use both of the inserts on opposed sides of a center housing to interact with side light housings. If enough room is available for two receivers, a receiver can be provided for each of the end units with the central unit being "squeezed" between the two. If there is enough room for two receivers but yet the two receivers must be basically adjacent one another, each can be used just as in a dual light arrangement, i.e., with a spring finger of each in a complementary aperture of the last end housing with the other spring finger inserted in an aperture of the center housing.

As mentioned at the beginning of the detailed description, applicant is not limited to the specific embodiment and variations described above. For example, although the preferred embodiment discussed above includes an insert for attaching light housings together, from the broad standpoint a dovetail, twist lock or plug-in arrangement also could be used. Moreover, applicant is quite aware that there are mechanical mechanisms besides the interlocking fingers to secure housings to a mount. The claims, their equivalents and their equivalent language define the scope of protection.

What is claimed is:

1. In an individual lighting arrangement for sports activities, a housing for a light bulb providing illumination, said housing defining an exterior female cavity configured to interact with a first position of an insert to hold such insert in a position filling said cavity, an intermediary receiver for securing said housing to a mount for an implement of the sports activity for which the lighting arrangement is provided, said intermediary receiver including means for interacting with said housing for securing the same to said receiver and, hence, to said mount, said means for interacting including a plurality of spring fingers which respectively interact with corresponding, complementary apertures in said housing.

2. The individual lighting arrangement of claim 1 wherein a pair of said spring fingers are spaced from one another an appropriate distance to selectively interact either with a pair of corresponding complementary apertures in a single housing or a pair of apertures individually provided by a pair of housings appropriately spaced from one another to cooperate in providing desired illumination.

3. The lighting arrangement of claim 1 wherein said means also includes a ledge which interacts with said housing to provide securance at its location.

4. The individual lighting arrangement of claim 1 wherein a pair of said spring fingers are spaced from one another an appropriate distance to selectively interact either with a pair of complementary apertures in the single housing or a pair of apertures individually provided by a pair of housings appropriately spaced from one another to cooperate in providing desired illumination, and wherein said means includes a ledge to interact with said single housing or said pair of housings to provide housing securance at the location of said ledge.

5. A modular individual lighting arrangement for sports activities comprising:

a source of electrical power;

a light bulb to be powered by said source to provide illumination;

means of delivering electrical power from said source to power said light bulb;

a first housing for said light bulb having an exterior configuration adapted to selectively attach said first housing to a second housing for a light bulb;

an intermediary receiver for securing one of said housing to a mount for an implement of the sports activity for which the lighting arrangement is provided, said intermediary receiver includes means for interacting with said one of said housing for securing the same to said receiver and, hence, to said mount; and said means for interacting including a plurality of spring fingers which respectively interact with corresponding, complementary apertures in said housing.

6. The modular individual lighting arrangement of claim 5 wherein a pair of said spring fingers are spaced from one another an appropriate distance to selectively interact either with a pair of corresponding complementary apertures in a single housing or a pair of apertures individually provided by a pair of housings appropriately spaced from one another to cooperate in providing desired illumination.

* * * * *